US010658006B2

(12) United States Patent
Onozawa

(10) Patent No.: US 10,658,006 B2
(45) Date of Patent: May 19, 2020

(54) IMAGE PROCESSING APPARATUS THAT SELECTS IMAGES ACCORDING TO TOTAL PLAYBACK TIME OF IMAGE DATA, IMAGE SELECTION METHOD, AND COMPUTER-READABLE MEDIUM

(71) Applicant: CASIO COMPUTER CO., LTD., Tokyo (JP)

(72) Inventor: Masaru Onozawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/347,517

(22) Filed: Nov. 9, 2016

(65) Prior Publication Data
US 2017/0194034 A1  Jul. 6, 2017

(30) Foreign Application Priority Data

Nov. 18, 2015  (JP) ................... 2015-226133
Nov. 18, 2015  (JP) ................... 2015-226134

(51) Int. Cl.
*G11B 27/10* (2006.01)
*G11B 27/031* (2006.01)
(Continued)

(52) U.S. Cl.
CPC .......... *G11B 27/10* (2013.01); *G06K 9/00758* (2013.01); *G11B 27/031* (2013.01); *G11B 27/28* (2013.01); *H04N 5/77* (2013.01)

(58) Field of Classification Search
CPC .................. G11B 27/10; G06K 9/00758
See application file for complete search history.

(56) References Cited

U.S. PATENT DOCUMENTS 5,642,430 A     6/1997  Greer et al.
2010/0020224 A1  1/2010  Hattori et al.
(Continued)

FOREIGN PATENT DOCUMENTS

EP    2 116 970 A1   11/2009
JP    2005-033554 A   2/2005
(Continued)

OTHER PUBLICATIONS

The extended European Search Report dated Apr. 19, 2017 issued in corresponding European Patent Application No. 16198117.0. (8 pages).
(Continued)

*Primary Examiner* — Thai Q Tran
*Assistant Examiner* — Girumsew Wendmagegn
(74) *Attorney, Agent, or Firm* — Fitch, Even, Tabin & Flannery LLP

(57) ABSTRACT

To make it possible to select images for generating a moving image even when individual playback times of images which are targeted for selection differ from each other. The image acquisition unit acquires a plurality of images. The feature amount calculation unit evaluates the plurality of images acquired. The moving image playback time setting unit sets a total playback time of data composed of the plurality of images. The image playback time setting unit sets individual playback times for each of the plurality of images. The image selection unit selects a predetermined number of images according to the total playback time from the plurality of images, based on (i) evaluation results of the plurality of images which have been evaluated, and (ii) the individual playback times which have been set, and (iii) the total playback time which has been set.

19 Claims, 11 Drawing Sheets

(51) Int. Cl.
  *G11B 27/28* (2006.01)
  *G06K 9/00* (2006.01)
  *H04N 5/77* (2006.01)

(56) References Cited

U.S. PATENT DOCUMENTS

| | | | |
|---|---|---|---|
| 2010/0092091 A1* | 4/2010 | Kanda | A61B 1/041 |
| | | | 382/190 |
| 2010/0094441 A1* | 4/2010 | Mochizuki | G06F 17/30256 |
| | | | 700/94 |
| 2011/0081088 A1 | 4/2011 | Xiao | |
| 2012/0099842 A1 | 4/2012 | Yasuda | |

FOREIGN PATENT DOCUMENTS

| | | |
|---|---|---|
| JP | 2006-340108 A | 12/2006 |
| JP | 3952684 B2 | 5/2007 |
| JP | 2007-188561 A | 7/2007 |
| JP | 2007-267351 A | 10/2007 |
| JP | 2008-312060 A | 12/2008 |
| JP | 2010-177731 A | 8/2010 |
| JP | 2011-9976 A | 1/2011 |
| JP | 2011-29916 A | 2/2011 |
| JP | 2011-299196 A | 2/2011 |
| JP | 2011082915 A | 4/2011 |
| JP | 4811433 B2 | 11/2011 |
| JP | 5072757 B2 | 11/2012 |
| JP | 2013-232813 A | 11/2013 |
| JP | 2015-114920 A | 6/2015 |
| JP | 2015-126517 A | 7/2015 |

OTHER PUBLICATIONS

JPO; Japanese Patent Application No. 2015-226133; Notification of Reasons for Refusal dated Jul. 3, 2018.
JPO; Application No. 2015-226133; Office Action dated Apr. 17, 2018.
U.S. Appl. No. 15/348,393; Office Action dated Apr. 30, 2019.
U.S. Appl. No. 15/348,393; Office Action dated Sep. 27, 2018.
U.S. Appl. No. 15/348,393; Office Action dated Jun. 12, 2018.
U.S. Appl. No. 15/348,393; Office Action dated Nov. 14, 2017.
JPO; Application No. 2015-226135; Notification of Reasons for Refusal dated May 23, 2017.

* cited by examiner

FIG. 2A
| Image [p] | A | B | C | D |
|---|---|---|---|---|
| Time [τ] | 2 | 3 | 1 | 2 |
| Score [s] | 8 | 5 | 10 | 6 |
FIG. 2B
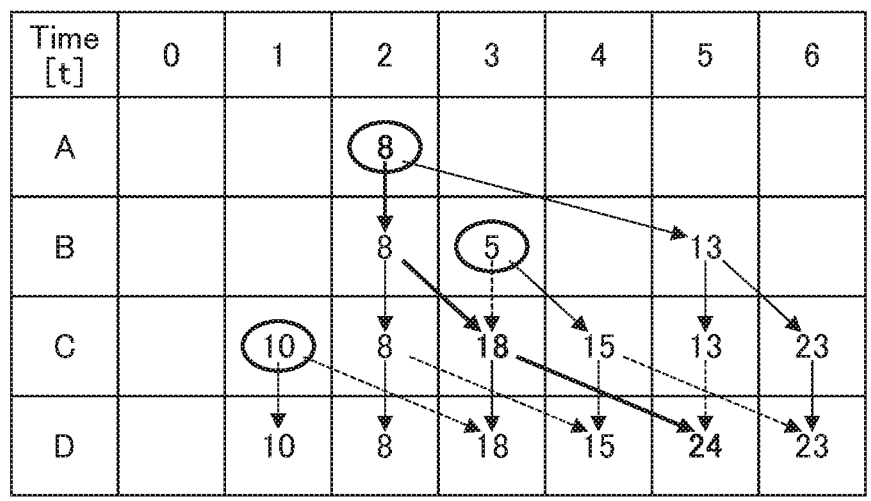
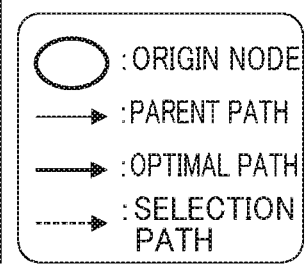

FIG. 3A
| Image [p] | A | B | C | D |
|---|---|---|---|---|
| Time [τ] | 2 | 3 | 1 | 2 |
| Score [s] | 8 | 5 | 10 | 6 |
| Feat | 1 | 3 | 2 | 2 |
FIG. 3B
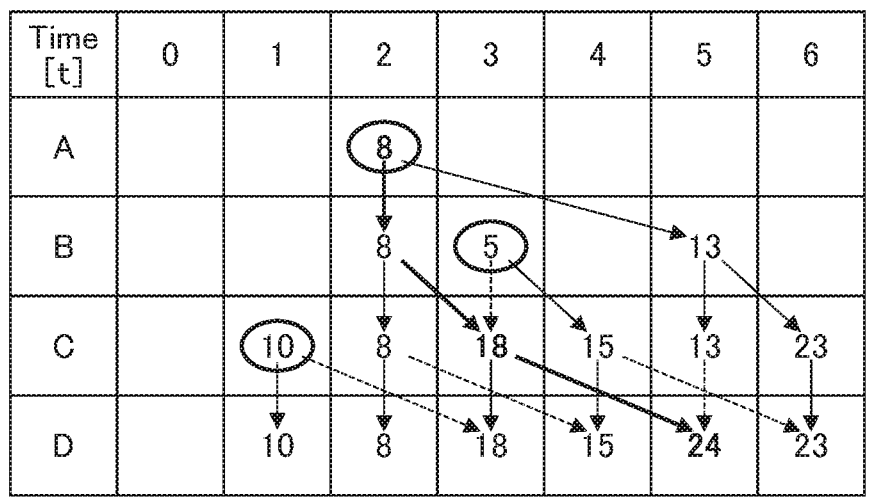
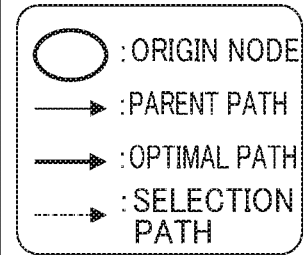
FIG. 3C
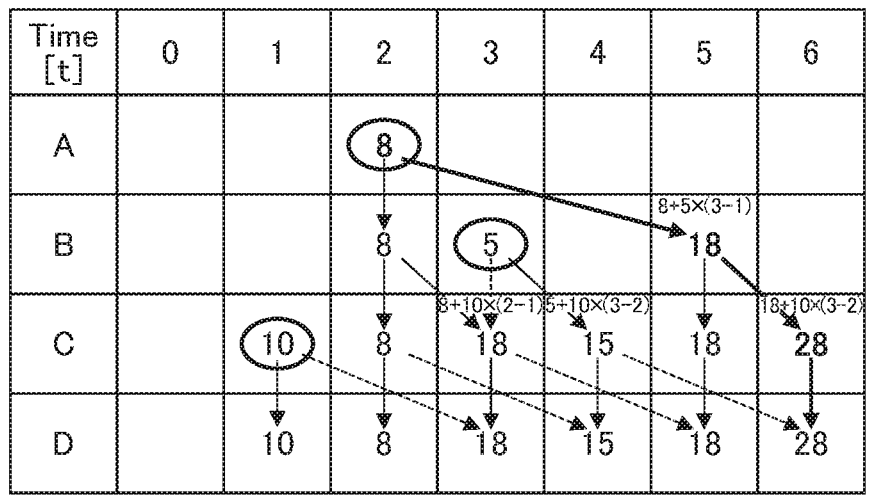
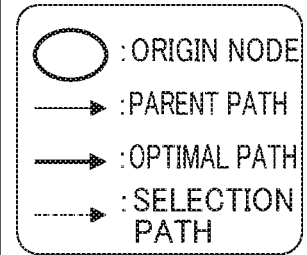

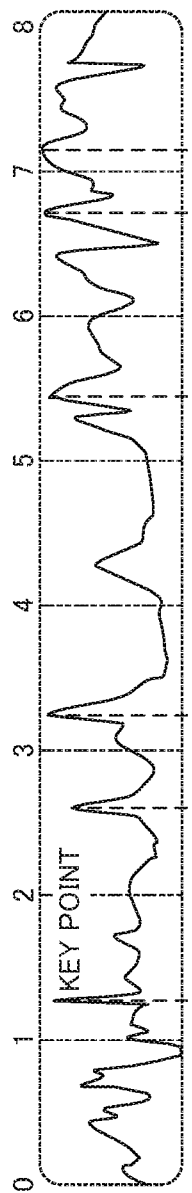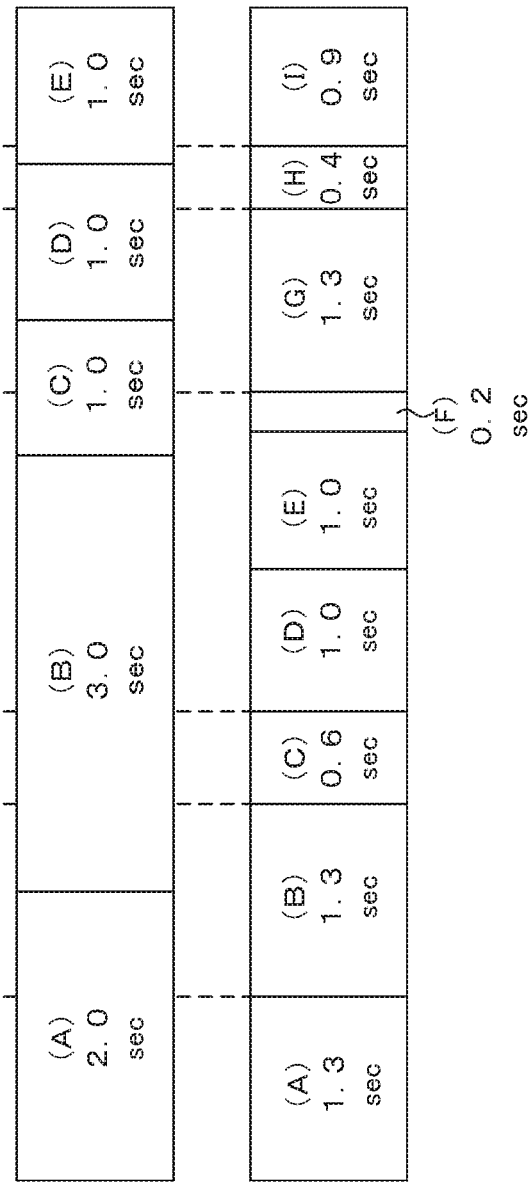

FIG. 5A
| Image [p] | A | B | C | D | E |
|---|---|---|---|---|---|
| Time [$\tau$] | 2 | 3 | 1 | 2 | 2 |
| Score [s] | 8 | 5 | 10 | 6 | 7 |
FIG. 5B
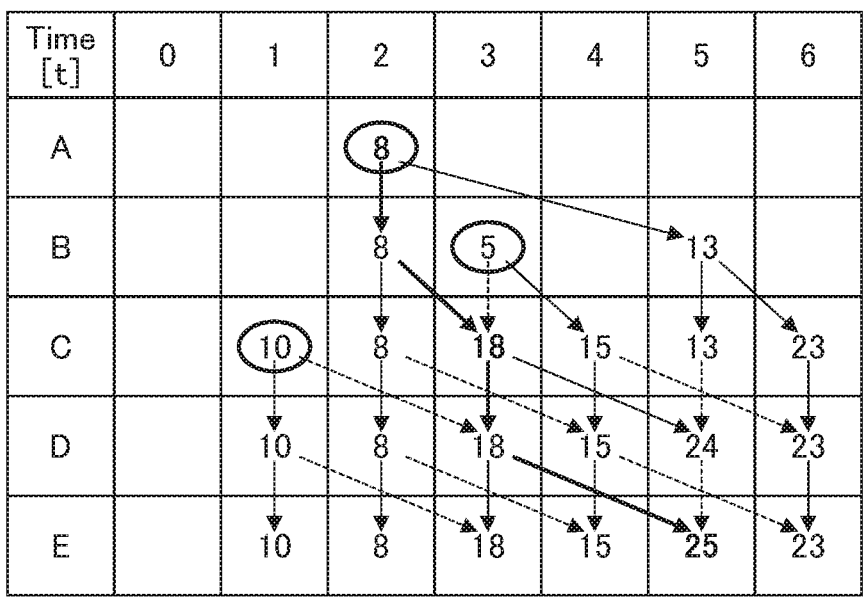
FIG. 5C
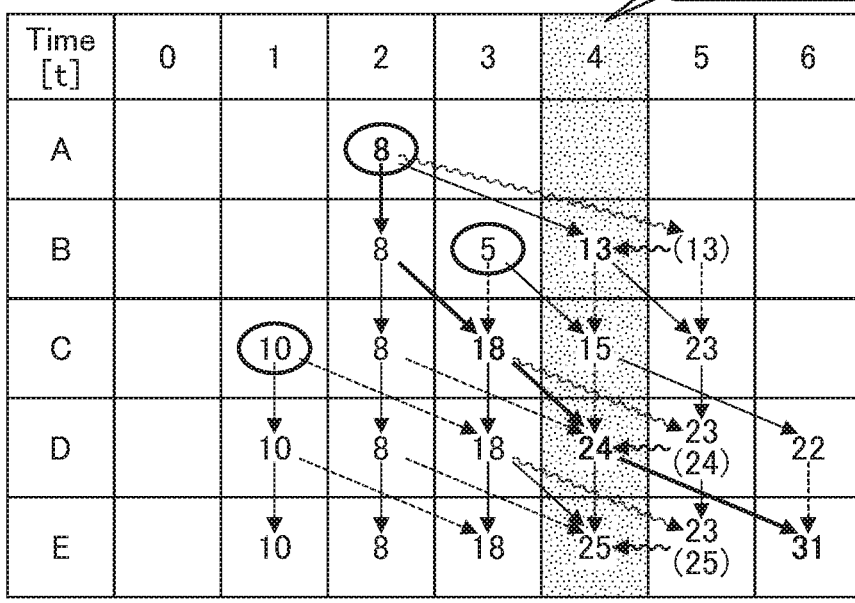

FIG. 7A
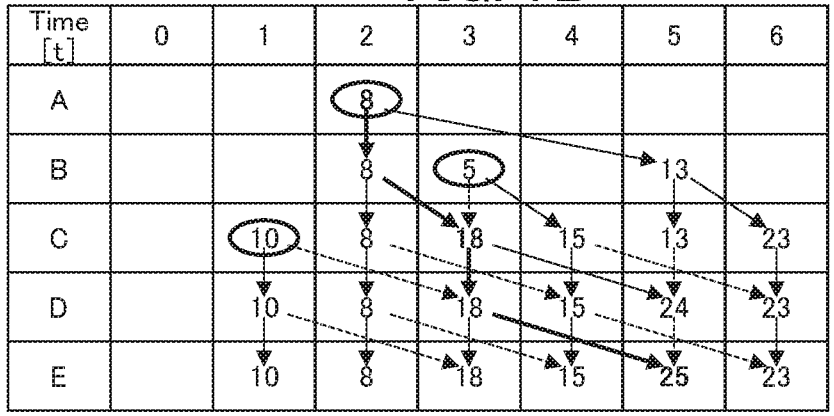
FIG. 7B
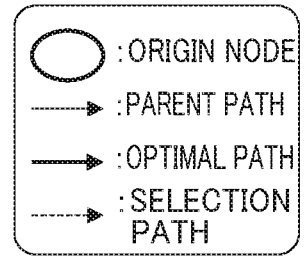
FIG. 7C
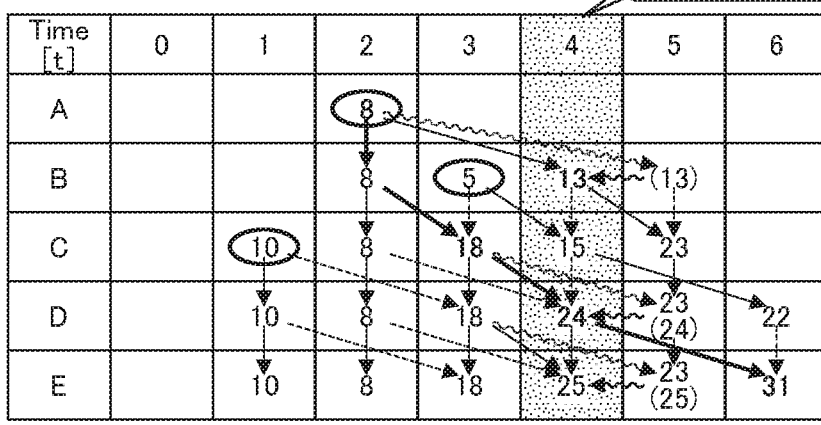
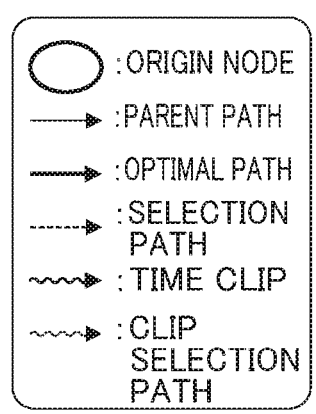
FIG. 7D
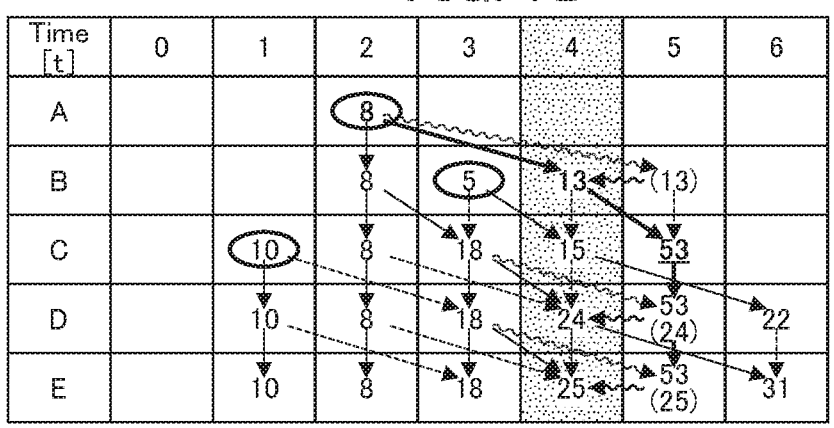
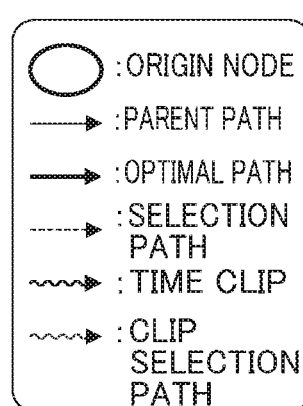

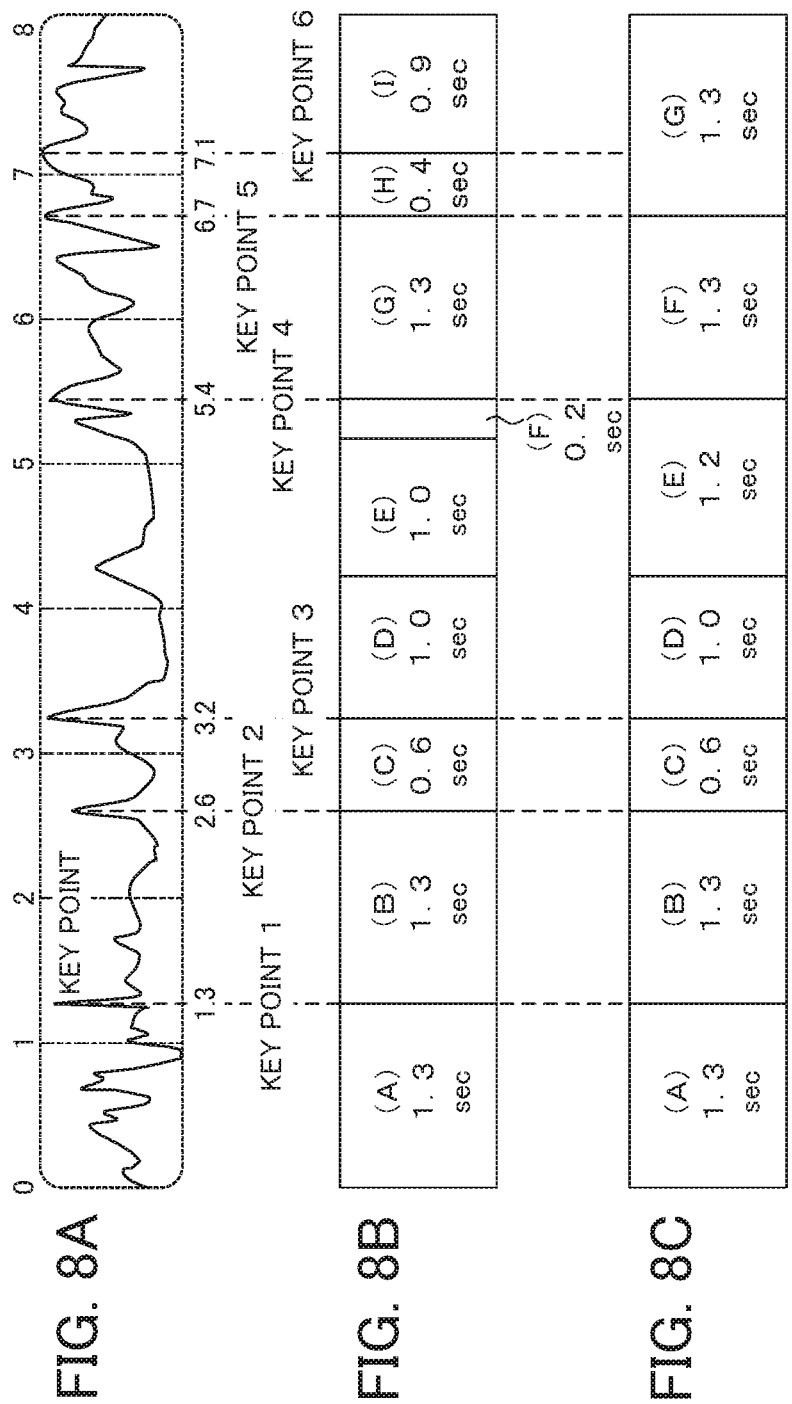

FIG. 9A
| Image [p] | A | B | C | D | E |
|---|---|---|---|---|---|
| Time [τ] | 1 | 2 | 3 | 2 | 2 |
| Score [s] | 4 | 10 | 5 | 6 | 7 |
FIG. 9B
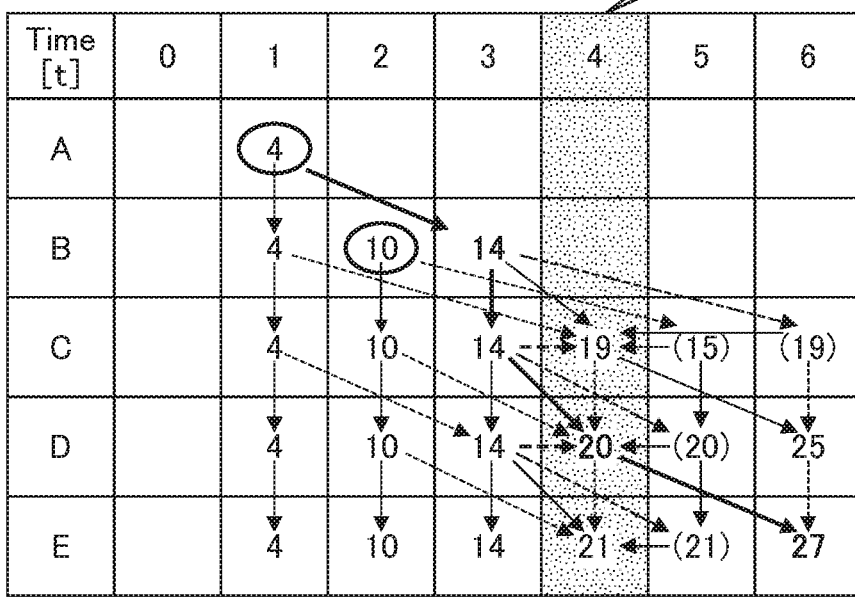
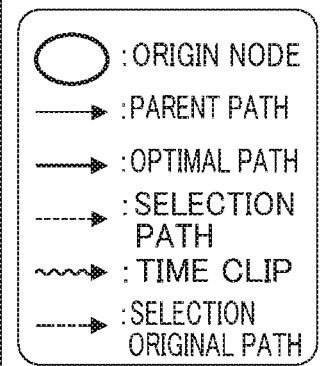
KEY POINT
○ : ORIGIN NODE
— : PARENT PATH
→ : OPTIMAL PATH
--→ : SELECTION PATH
∿∿ : TIME CLIP
—·→ : SELECTION ORIGINAL PATH
FIG. 9C
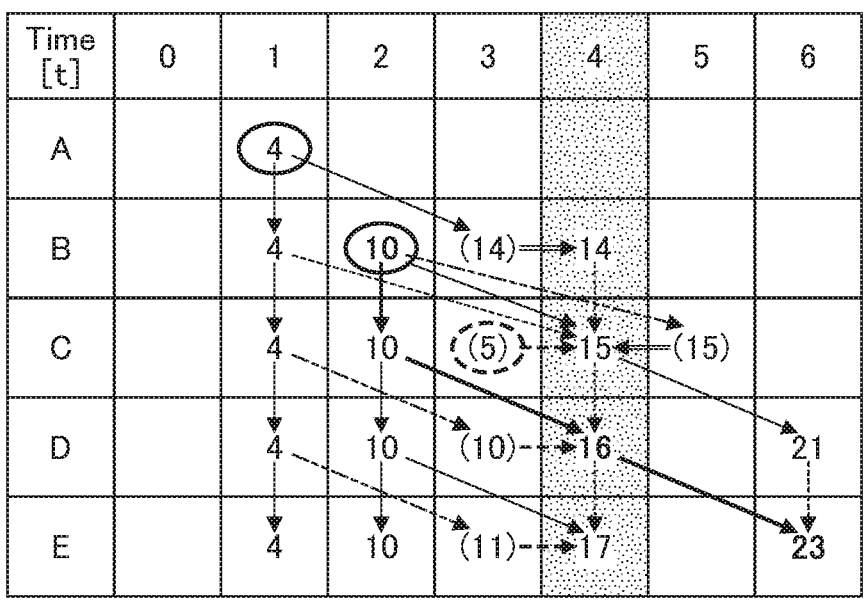
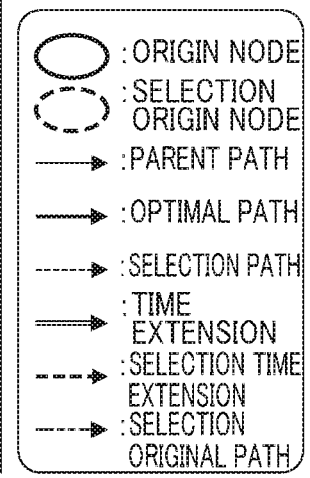
○ : ORIGIN NODE
◌ : SELECTION ORIGIN NODE
— : PARENT PATH
→ : OPTIMAL PATH
--→ : SELECTION PATH
⇒ : TIME EXTENSION
--⇒ : SELECTION TIME EXTENSION
—·→ : SELECTION ORIGINAL PATH

IMAGE PROCESSING APPARATUS THAT SELECTS IMAGES ACCORDING TO TOTAL PLAYBACK TIME OF IMAGE DATA, IMAGE SELECTION METHOD, AND COMPUTER-READABLE MEDIUM

CROSS-REFERENCE TO RELATED APPLICATIONS

This application is based on and claims the benefit of priority from Japanese Patent Application No. 2015-226133 and No. 2015-226134 both filed on Nov. 18, 2015, the content of which is incorporated herein by reference.

BACKGROUND OF THE INVENTION

Field of the Invention

The present invention relates to an image processing apparatus that selects images according to a total playback time of image data, an image selection method, and a computer-readable medium.

Related Art

Conventionally, as disclosed in Japanese Unexamined Patent Application, Publication No. 2010-177731, there is a technology of generating a moving image such as a slide show by compositing a plurality of kinds of images.

SUMMARY OF THE INVENTION

According to an aspect of the present invention, an image processing apparatus, includes: a processor which is configured to: acquire a plurality of images; evaluate the plurality of images; set a total playback time of moving image composed of a plurality of images; set an individual playback time for each of the plurality of images; and select a predetermined number of images according to the total playback time from the plurality of images, based on (i) evaluation results of the plurality of images which have been evaluated, and (ii) the individual playback times which have been set, and (iii) the total playback time which has been set.

According to another aspect of the present invention, an image processing apparatus includes: a processor which is configured to: acquire a plurality of images; set an individual playback time to each of the plurality of images acquired; set a total playback time; set switching time points of images in the total playback time that is set; and select a predetermined number of images from the plurality of images so as to be within the total playback time based on the switching time points.

According to yet another aspect of the present invention, an image selection method includes the steps of: acquiring a plurality of images; evaluating the plurality of images acquired in the step of acquiring; setting a total playback time of moving image composed of a plurality of images; setting an individual playback time for each of the plurality of images; and selecting a predetermined number of images according to the total playback time from the plurality of images based on (i) evaluation results of the plurality of images which have been evaluated, and (ii) the individual playback times which have been set, and (iii) the total playback time which has been set.

According to still another aspect of the present invention, a non-transitory storage medium encoded with a computer-readable program enables a computer to execute functions as: acquire a plurality of images; evaluate the plurality of images; set a total playback time of moving image composed of a plurality of images; set an individual playback time for each of the plurality of images; and select a predetermined number of images according to the total playback time from the plurality of images, based on (i) evaluation results of the plurality of images which have been evaluated, and (ii) the individual playback times which have been set, and (iii) the total playback time which has been set.

BRIEF DESCRIPTION OF THE DRAWINGS

FIG. 2A is a schematic diagram illustrating a specific example of an optimization classified by score;

FIG. 2B is a schematic diagram illustrating a specific example of an optimization classified by score;

FIG. 3A is a schematic diagram illustrating a specific example of an optimization classified by score in which redundancy is eliminated;

FIG. 3B is a schematic diagram illustrating a specific example of an optimization classified by score in which redundancy is eliminated;

FIG. 3C is a schematic diagram illustrating a specific example of an optimization classified by score in which redundancy is eliminated;

FIG. 4A is a schematic diagram for explaining a playback position of an image when performing key-point synchronization optimization;

FIG. 4B is a schematic diagram for explaining a playback position of an image when performing key-point synchronization optimization;

FIG. 4C is a schematic diagram for explaining a playback position of an image when performing key-point synchronization optimization;

FIG. 5A is a schematic diagram illustrating a specific example of key-point synchronization optimization;

FIG. 5B is a schematic diagram illustrating a specific example of key-point synchronization optimization;

FIG. 5C is a schematic diagram illustrating a specific example of key-point synchronization optimization;

FIG. 7A is a schematic view for explaining a specific example of key-point synchronization optimization in a key-point priority setting of a high rank image;

FIG. 7B is a schematic view for explaining a specific example of key-point synchronization optimization in a key-point priority setting of a high rank image;

FIG. 7C is a schematic view for explaining a specific example of key-point synchronization optimization in a key-point priority setting of a high rank image;

FIG. 7D is a schematic view for explaining a specific example of key-point synchronization optimization in a key-point priority setting of a high rank image;

FIG. 8A is a schematic view for explaining a playback position of an image in a case in which a short-time playback image exists when performing key-point synchronization optimization;

FIG. 8B is a schematic view for explaining a playback position of an image in a case in which a short-time playback image exists when performing key-point synchronization optimization;

FIG. 8C is a schematic view for explaining a playback position of an image in a case in which a short-time playback image exists when performing key-point synchronization optimization;

FIG. 9A is a schematic view for explaining a specific example of a playback time adjustment in a case in which a short-time playback image exists when performing key-point synchronization optimization;

FIG. 9B is a schematic view for explaining a specific example of a playback time adjustment in a case in which a short-time playback image exists when performing key-point synchronization optimization;

FIG. 9C is a schematic view for explaining a specific example of a playback time adjustment in a case in which a short-time playback image exists when performing key-point synchronization optimization;

DETAILED DESCRIPTION OF THE INVENTION

Embodiments of the present invention are explained below with reference to the drawings.

Figure 1:
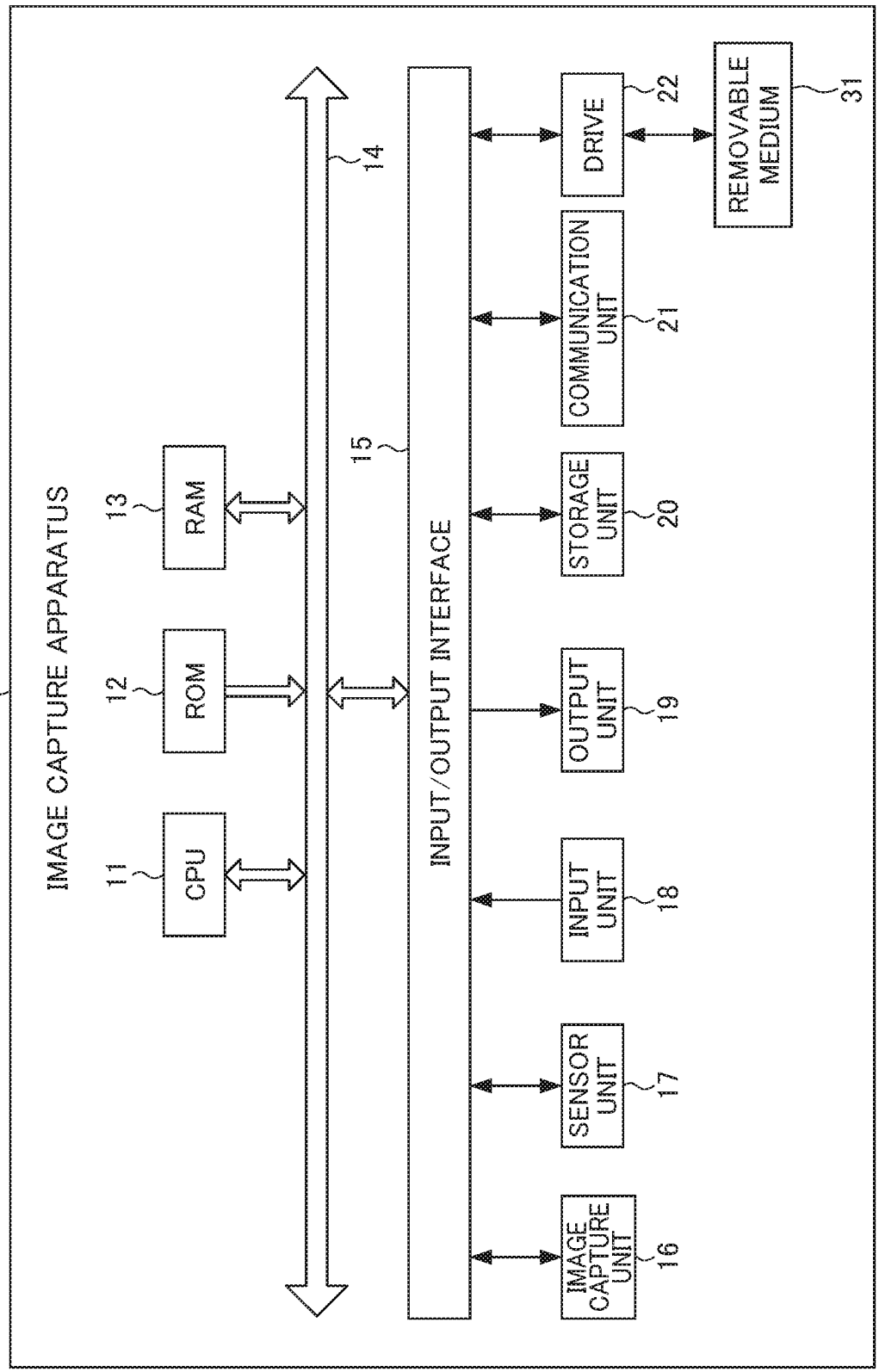
FIG. 1 is a block diagram illustrating a hardware configuration of an image capture apparatus according to an embodiment of the present invention.

FIG. 1 is a block diagram illustrating a hardware configuration of an image capture apparatus 1 according to a first embodiment of the present invention.

The image capture apparatus 1 is configured as, for example, a digital camera.

The image capture apparatus 1 includes a CPU (Central Processing Unit) 11, ROM (Read Only Memory) 12, RAM (Random Access Memory) 13, a bus 14, an input/output interface 15, an image capture unit 16, a sensor unit 17, an input unit 18, an output unit 19, a storage unit 20, a communication unit 21, and a drive 22.

The CPU 11 executes various processing according to programs that are recorded in the ROM 12, or programs that are loaded from the storage unit 20 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the sensor unit 17, the input unit 18, the output unit 19, the storage unit 20, the communication unit 21, and the drive 22 are connected to the input/output interface 15.

The image capture unit 16 includes an optical lens unit and an image sensor, which are not illustrated.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example.

Light incident through the optical lens unit forms an image of a subject in the optoelectronic conversion device.

The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal.

The variety of signal processing generates a digital signal that is output as an output signal from the image capture unit 16.

Such an output signal of the image capture unit 16 is hereinafter referred to as "data of a captured image". Data of a captured image is supplied to the CPU 11, an image processing unit (not illustrated), and the like as appropriate.

The sensor unit 17 is configured by various kinds of sensors such as an acceleration sensor which obtains information relating to acceleration and a gyro sensor which obtains information relating to an angular speed.

In the present embodiment, when photographing is performed at the image capture unit 16, sensor information upon photographing is obtained and the information is stored by being associated with images photographed.

The input unit 18 is configured by various buttons and the like, and inputs a variety of information in accordance with instruction operations by the user.

The output unit 19 is configured by the display unit, a speaker, and the like, and outputs images and sound.

The storage unit 20 is configured by DRAM (Dynamic Random Access Memory) or the like, and stores data of various images.

The communication unit 21 controls communication with other devices (not shown) via networks including the Internet.

A removable medium 31 composed of a magnetic disk, an optical disk, a magneto-optical disk, semiconductor memory or the like is installed in the drive 22, as appropriate.

Programs that are read via the drive 22 from the removable medium 31 are installed in the storage unit 20, as necessary.

Similarly to the storage unit 20, the removable medium 31 can also store a variety of data such as the image data stored in the storage unit 20.

When trying to browse a plurality of images stored, since it take a great amount of time to browse all of the images, the image capture apparatus 1 as configured above has a function of selecting only characteristic images which are fewer than the total number of the plurality of images stored and providing them for a user to browse.

In the image capture apparatus 1 according to the present embodiment, the images selected are made into a moving image as frame images in order to generate a summarized moving image in which only characteristic scenes are collected (hereinafter, referred to as "highlight moving image") and provided to the user to browse.

Basic Flow of Selection Method of Image Combination (Optimization Classified by Score)

In the present embodiment, the image capture apparatus 1 calculates a feature amount of an image which is targeted for generating a highlight moving image (hereinafter, also referred to as "candidate image"), based on attribute information such as sensor information when photographing an image (acceleration information and angular speed information), an image analysis result (presence or absence of a specific subject such as a face, etc.), and information relating to a usage condition (the number of playbacks, information relating to uploading to SNS, etc.).

Then, the image capture apparatus 1 sets a score as a value of an image (hereinafter, referred to as "image score") based on the feature amount thus calculated.

It should be noted that the image score may be set uniquely according to an item used for calculating the feature amount based on a person's subjectivity.

It should also be noted that the image score may be set comprehensively according to weighting by weighting each of the items of the feature amounts based on machine learning with subjective evaluation results as training data.

In addition, the image capture apparatus 1 performs ranking based on the image score.

The rank is used for determining individual playback times of the images in the highlight moving image to be generated.

It should be noted that the rank may be given arbitrarily by a user or may be given according to an image score that is set to an image.

In addition, the image capture apparatus 1 searches for a path in which a score generated by adding up image scores of each of the images (hereinafter, referred to as "added score") becomes the maximum combination in the order of capturing the images among image combinations having the total individual playback time (total playback time) within the maximum playback time, with the maximum playback time of the highlight moving image as the upper limit.

Here, in the present embodiment, selecting the path of the maximum added score under the regulation of the maximum playback time of a moving image is referred to as "optimization classified by score".

FIGS. 2A and 2B are schematic views illustrating a specific example of an optimization classified by score. In the present example, the maximum playback time of a highlight moving image is set to 6 seconds.

It should be noted in FIG. 2B that, as a path from an origin node, a path which does not become an appropriate path from the view point of the combination of individual playback times, the image scores, etc., is shown as "exclusion path", a path that can be set is shown as "parent path", and a path in which the added score becomes the highest is shown as "optimal path".

For example, in the present embodiment, a path in which images are combined in the order of photography is set on the matrix of the individual playback time and the images in the order of photography.

The image capture apparatus 1 selects, as an image group that constitutes a highlight moving image, a path combination in which the added score that is made by adding image scores of images in a path becomes the maximum score among each of the path combinations.

The "path in which the images are combined in the order of photography" refers to a path which is calculated by performing a path search sequentially from the first image toward the final image in the order of photographing the images in the present embodiment.

In the example of FIG. 2A, an image A to an image D in the order of photography are set as candidate images for frame images which constitute a highlight moving image.

In the image A to the image D, image scores calculated based on feature amounts of images are set: the image A [Score: 8]; the image B [Score: 5]; the image C [Score: 10]; and the image D [Score: 6]. Individual playback times of images are also set: the image A [Time: 2 seconds]; the image B [Time: 3 seconds]; the image C [Time: 1 second]; and the image D [Time: 2 seconds].

In addition, the individual playback time may be configured so as to correspond to an image score, etc.

For example, it may be configured so that an image having a high image score has a longer individual playback time and an image having a low image score has a shorter individual playback time.

In FIG. 2B, in the image group in which the image scores and the individual playback time are set, the image capture apparatus 1 sets a path in which the images are combined in the order of photography within the maximum playback time of a moving image that is set in the matrix of the vertical axis representing the order of photographing images and the horizontal axis representing playback times of moving images.

The image capture apparatus 1 calculates added scores of all of the images that constitute a path in the path that is set, and selects a path combination having the maximum added score.

In the present example, a path in which the added score becomes [24] among each of the paths becomes a path in which the added score becomes the maximum score.

This path is composed of the combination of the image C and the image D with the image A as an origin node.

In other words, the path from the image A to the image C and to the image D becomes an optimal path.

It should be noted that, although the optimization classified by score which takes into account the added score only is performed in the present example, it may be configured so that the optimization classified by score which takes into account the matter of making a total playback time longer is performed.

In such a case, the total playback time becomes 6 seconds, which is the maximum score, and the image capture apparatus 1 selects the combination of the image B and the image C with the image A as an origin node for which the added score is [23], which is comparatively high.

Then, the image capture apparatus 1 creates a highlight moving image from frame images based on the combination order of the images determined and the total playback times.

Improvement of Dissimilarity (Elimination of Redundancy)

In the case of performing the optimization classified by score as described above, since a feature amount is associated with a score, a similar image may be included in a combination to be selected.

In the present method, the dissimilarities among images are calculated and the similarities among the images are converted as penalties and given to image scores.

Since an added score, which is a resultant total of image scores, becomes low by performing compensation by lowering the image score of an image having the high similarity to a close image, a path of the combination of similar images is not easily selected.

In addition, although the compensation is performed by lowering image scores of images having the high similarities among the images, it may be configured so as to perform compensation by raising image scores of images having the low similarities among the images.

In the present example, the dissimilarity, which is the degree of being not similar, is calculated between an image which is located upstream by one in a path (an image a generation ago in the path [parent]) and an image for determining the dissimilarity (hereinafter, referred to as an "attention image") [Formula (1)].

[Formula 1]

$$\text{Dissimilarity}(I_p, I_q) = \sum_{i=0}^{n} \frac{\text{abs}\left(_i^p\text{Feat} - _i^q\text{Feat}\right)}{\text{FeatVar}_i} W_i \qquad (1)$$

It should be noted that, in Formula 1, "Dissimilarity" refers to the degree of dissimilarity, "$I_p$" refers to Image p, "$I_q$" refers to Image q, "$P_i\text{Feat}$" refers to i feature amount of Image p, "$q_i\text{Feat}$" refers to i feature amount of Image q, "$\text{FeatVar}_i$" refers to the deviation of i feature amounts, and "$W_i$" refers to a weighting coefficient.

Then, a penalty amount according to the dissimilarity is calculated [Formula 2].

It should be noted that penalty takes into account not only permutations of adjacent images, but also distant images.

In the present embodiment, the penalty amount is calculated so as to become smaller as the generations become farther from each other.

[Formula 2]

$$\text{Pena}_{pq} = \text{Dissimilarity}(I_p, I_q) \times G(\text{Dist})(p, q) \qquad (2)$$

It should be noted that, in Formula 2, "Dissimilarity" refers to the degree of dissimilarity, "$I_p$" refers to Image p, "$I_q$" refers to Image q, "G" refers to a weighting function of a distance between generations, and "Dist" refers to a distance between the generations.

The "distance between generations" in the present embodiment refers to distances calculated from combinations between an attention image and the other images in a path.

For example, adjacent images before and behind an attention image are referred to as images of a first generation, and images next to the adjacent images are referred to as images of a second generation. Therefore, the "distance between generations" is determined based on the number of images existing between the image p and the image q.

The penalty amounts between an attention image and the images of generations are calculated from a generation upstream, and a resulting minimum penalty score is multiplied by the image score of the attention image so that an image score used when selecting an image to which a penalty is given

[Formula 3]

$$\text{Score}_p = \min_{q \in R}(\text{Pena}_{pq}) \qquad (3)$$

It should be noted that "$\text{Score}_p$" refers to a final score of Image p, and "q" refers to a parent node image.

"R" refers to an area that takes into account redundancy, and "$\text{Pena}_{pq}$" refers to a redundant penalty amount between Image p and Image q.

In addition, regarding a formula for determining an image score, the following Formula 3-1 may be used which determines an image score to which a penalty is given by adding the penalties calculated from the generations upstream and multiplying the penalties by the image score of the attention image.

[Formula 4]

$$\text{Score}_p = \text{ImgScore} \times \sum_{q \in R} \text{Pena}_{pq} \qquad (4)$$

It should be noted that "$\text{Score}_p$" refers to a final score of Image P, and "$\text{ImgScore}_p$" refers to a score of Image p calculated from a feature amount.

"q" refers to a parent node image, "R" refers to an area that takes into account redundancy, and "$\text{Pena}_{pq}$" refers to a redundancy penalty amount between Image p and Image q.

As described above, the image capture apparatus 1 calculates an added score by giving a penalty to an image score of each of images according to the similarities between the images in each of the paths from combinations.

Thereafter, the image capture apparatus 1 selects a path having a combination of the highest added score as an optimal path.

FIGS. 3A to 3C are schematic views illustrating a specific example of an optimization classified by score which eliminates redundancy.

In the present example, the maximum playback time of a highlight moving image is set to 6 seconds.

It should be noted that, in the present example, a generation R that should be taken into account is only one generation before (adjacent), and abs ($F_p$-$F_q$) is set as a penalty.

In the example of FIG. 3A, regarding the image score S and the individual playback time τ in each of the images p, the image score is [Score: 8], the individual playback time is [Time: 2], and the feature amount of the image is [Feat: 1] in the image A.

In the image B, the image score is [Score: 5], the individual playback time is [Time: 3], and the feature amount of the image is [Feat: 3].

In the image C, the image score is [Score: 10], the individual playback time is [Time: 1], and the feature amount of the image is [Feat: 2].

In the image D, the image score is [Score: 6], the individual playback time is [Time: 2], and the feature amount of the image is [Feat: 2].

In addition, images become more similar and the similarity becomes higher as the values of the feature amounts "Feat" are closer in the present embodiment.

In a case of not taking into account the redundancy in the images A to D as described above, as illustrated in FIG. 3B, the added score becomes [24], which is the maximum score, by selecting a combination of the image C and the image D with the image A as an origin node. In other words, the path from the image A to the image C and to the image D becomes an optimal path.

On the other hand, in a case of using a method eliminating the redundancy as described above, as illustrated in FIG. 3C, the added score becomes [28], which is the maximum score, by selecting a combination of the image B and the image C with the image A as an origin node.

In other words, the path from the image A to the image B and to the image C becomes the optimal path.

Here, in a case of not using the abovementioned method, a path combination having the maximum added score is a combination of the path of the image A of [Feat: 1], the image C of [Feat: 2] having a small difference in the feature amount, and the image D. On the other hand, in a case of using the present method, a path combination having the maximum added score is a combination of the path of the image B of [Feat: 3] having a large difference in the feature amount from the image A as an origin node, and the image C. It should be noted that the added score does not become the maximum score in a case of setting the image B as an origin node, and then combining the image B with the image C.

Therefore, with the present method, it is possible to improve the dissimilarity by eliminating the redundancy by giving the penalty according to the similarity between the images to the image score, and thus it is possible to select a path combination in which the added score becomes the maximum score at a high speed as much as possible within the limitations such as time and the number.

Sound Synchronization Playback: Key-Point Synchronization Optimization

In the image capture apparatus 1 according to the present embodiment, it may be configured to play back a background music (hereinafter, referred to as BGM) while playing back a highlight moving image generated.

During this, it is configured so that switching of images in the highlight moving image corresponds to a switching point such as a rhythm or a phrase of the BGM so as to link the highlight moving image and the BGM. For example, when generating a highlight moving image, adjustments of the order of selecting images, the number of the images selected, and individual playback times of the images are performed by taking into account the contents of BGMs (for example, a point at which timing of a rhythm or rhythm changes, a start point of a phrase, an end point of the phrase, a point of a change of key, etc.).

In this way, it is possible to perform display of a preferable moving image having the cooperation between image and sound by matching the switching of a scene in a highlight moving image (switching to a different kind of a frame image) and the switching of music.

Regarding music which is played back with a moving image, a position at which an image is desired to be switched (hereinafter, referred to as "key point") is set within a playback time of the music.

For example, the key point may be set automatically at a point at which a certain change is found in the music such as an extreme value of sound pressure, a change of rhythm or may be set at any point by a user.

It is also possible to adjust the individual playback time, the playback timing, etc., of an image within the highlight moving image so that a switching position of each of the images in a highlight moving image which is generated beforehand corresponds to a key point of the music that is played back with the highlight moving image.

In this case, the timing of the start/end of displaying an image that straddles a key point is changed by sliding to a point in time before or after the images so that the key point becomes a switching point of the images.

In addition, it may be configured to generate a highlight moving image by selecting an image so as to correspond to a key point that is set in advance.

FIGS. 4A to 4C are schematic views for explaining a playback position of an image in a case of performing key-point synchronization optimization on a highlight moving image.

It should be noted that, as illustrated in FIG. 4A, the maximum playback time of a highlight moving image is set to 8.0 seconds in the present example. In addition, the key point in music is, for example, set automatically at a location at which a certain change in the sound information constituting the music is found. Each of the key points are set to key point 1: 1.3 seconds, key point 2: 2.6 seconds, key point 3: 3.2 seconds, key point 4: 5.4 seconds, key point 5: 6.7 seconds, and key point 6: 7.1 seconds.

As illustrated in FIG. 4B, in a case of searching for an optimal combination having the highest added score without performing the key-point synchronization optimization, the image A: 2.0 seconds, the image B: 3.0 seconds, the image C: 1.0 second, the image D: 1.0 second, and the image E: 1.0 second are shown. Since the key points are not taken into account, the positions of the start/end of playing back an image selected do not correspond to the positions of the key points.

On the contrary, as illustrated in FIG. 4C, in a case of selecting a combination of images for which the optimization for synchronization of the positions of the start/end of playing back the images by taking into account the key points (hereinafter, referred to as "key-point synchronization optimization"), the individual playback time: 2.0 seconds is set in the image A; however, since the key point 1 arrives with the individual playback time thus set, the playback timing is adjusted by ending the display at the elapsed time of the key point 1: 1.3 seconds and so as to subsequently start the playback of the image B.

In addition, the individual playback time: 3.0 seconds is set in the image B; however, since a subsequent key point arrives with the individual playback time thus set, the individual playback time is adjusted to 1.3 seconds by ending the display at the elapsed time of the key point 2 from the key point 1: 2.6 seconds.

In addition, the individual playback time: 1.0 second is set in the image C; however, since a subsequent key point arrives with the individual playback time thus set, the individual playback time is adjusted to 0.6 seconds by ending the display at the elapsed time of the key point 3 from the key point 2: 3.2 seconds.

In addition, the individual playback time: 1.0 second is set in the image D and, since a subsequent key point does not arrive, the display is performed during the 1.0 second from the key point 3 (the elapsed time: 4.2 seconds).

In addition, the individual playback time: 1.0 second is set in the image E and, since a subsequent key point does not arrive, the display is performed during the 1.0 second after the end of the playback of the image D (the elapsed time: 5.2 seconds).

In the case of performing the key-point synchronization optimization, since the switching points of the images increase, the number of the images to be selected increases, as compared to the case of not performing the key-point synchronization optimization. Therefore, in the case of performing the key-point synchronization optimization, since it is necessary to select additional images which become necessary due to the switching points increasing, additional images are selected by taking into account the key points up to 8.0 seconds of the ending time of the moving image after the image E being displayed. It should be noted that the individual playback time is set to 2.0 seconds for the images after the image F to be selected thereafter, in the present example.

Although the individual playback time: 2.0 seconds is set in the image F selected, since a subsequent key point arrives, the individual playback time is adjusted to 0.2 seconds so as to end the display at the elapsed time of the key point 4: 5.4 from after the end of playing back the image E.

In addition, although the individual playback time: 2.0 seconds is set in the image G, since a subsequent key point arrives, the individual playback time is adjusted to 1.3 seconds so as to end the display at the elapsed time of the key point 5: 6.7 from after the end of playing back the image F.

In addition, although the individual playback time: 1.0 second is set in the image H, since a subsequent key point arrives, the individual playback time is adjusted to 0.4 seconds so as to end the display at the elapsed time of the key point 6: 7.1 from after the end of playing back the image G.

Finally, although the individual playback time: 1.0 second is set in the image I, since the maximum playback time of the moving image arrives, the individual playback time is adjusted to 0.9 seconds so as to end the display at the elapsed time of the maximum playback time of the moving image from after the end of playing back the image H.

FIGS. 5A to 5C are schematic views illustrating a specific example of the key-point synchronization optimization. It should be noted that, in the present example, the maximum playback time is set to 6 seconds and a key point is set at the playback time of a moving image: elapsed time of 4 seconds.

As illustrated in the example of FIG. 5A, regarding the image score S and the individual playback time τ in each of the images p, the image score is [Score: 8], and the individual playback time is [Time: 2 seconds] in the image A. In the image B, the image score is [Score: 5], and the individual playback time is [Time: 3 seconds]. In the image C, the image score is [Score: 10], and the individual playback time is [Time: 1 second]. In the image D, the image score is [Score: 6], and the individual playback time is [Time: 2 seconds]. In the image E, the image score is [Score: 7], and the individual playback time is [Time: 2 seconds].

In a case of performing the optimization classified by score without taking into account the key point with the individual playback time/image score of such images, as illustrated in FIG. 5B, the added score becomes [25], which is the maximum score, by selecting a path combination from the image A: 2 seconds as an origin node to the image C: 3 seconds, and to the image E: 5 seconds. In other words, the path from the image A to the image C and to the image E becomes the optimal path in a case of performing the optimization classified by score.

On the other hand, in a case of performing the key-point synchronization optimization, when a key point exists within the individual playback time of an image selected, the individual playback time of the image is adjusted to be shorter in order to perform switching of the images at the key point.

The individual playback time [τ] is set not to an individual playback time [τ] for which an individual playback time is set in advance, but rather to (K[t']−t) sec which is clipped at the key point K[t'] from the time [t] of ending the display of the image A. With reference to FIG. 5C for further explanation, if selecting the image B at the time of t=2 in a case of setting the image A: t=2 as an origin node, the individual playback time of the image B will straddle the key point K(t=4). Therefore, in order to switch the image at the key point reliably, the individual playback time of the image B is adjusted to 2 seconds so as to display the image B during the time of t=2 at which displaying the image A ends until the key point K(t=4).

With such a configuration, the case of straddling a key point while playing back an image is excluded and, as a result, the switching of images reliably occurs on the key points.

In other words, in the example of FIG. 5C, since the individual playback time of the image D is reduced and the switching to the image E is performed on the key point, the added score becomes [31], which is the maximum score, under the condition of the maximum playback time by selecting the path combination of the image C, the image D, and the image E from the image A as an origin node. In other words, in the case of performing the key-point synchronization optimization, the path from the image A, to the image C, to the image D, and to the image E becomes the optimal path.

Therefore, with the present method, it is possible to select a path in which the added score becomes the maximum score as much as possible, for example, within the limitations such as time and the number while switching the images in synchronization with rhythm of the BGM by clipping the individual playback time of an image at the time of a key point with respect to an image group which is scored based on values of the images. Therefore, it is possible to realize a combination of images having the maximum score within a predetermined regulation at a high speed in synchronization with rhythm of a BGM.

Key-Point Synchronization Optimization: Key-Point Priority of High Rank Image

In addition, it may be configured so as to adjust so that frame images which are switched at a key point at an important time such as the switching to a chorus part in a musical piece are a high rank. Since the frame images in a high rank are likely to be impressive images for a user, it is possible to play back a more preferable moving image for the user by switching the images at a key point at an important time in the moving image.

Figure 6A:
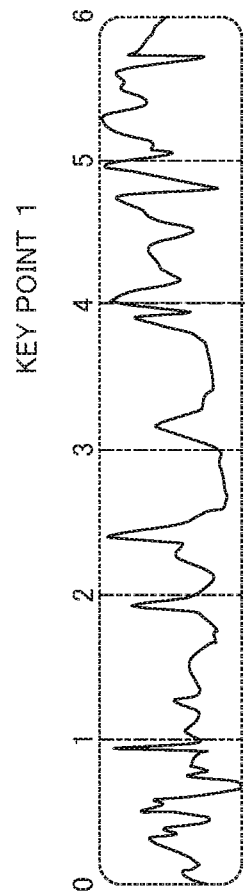
FIG. 6A is a schematic view for explaining a playback position of an image when performing key-point synchronization optimization in a key-point priority setting of a high rank image.

FIGS. 6A to 6D are schematic views for explaining a playback position in an image in a case of performing the key-point synchronization optimization in a key-point priority setting of a high rank image. It should be noted that, in the present example, as illustrated in FIG. 6A, the maximum playback time of a highlight moving image is set to 6.0 seconds. In addition, the key point in music is, for example, set automatically at a location at which a certain change in the sound information constituting the music is found. The key point 1 having a high priority is set to 4.0 seconds.

Figure 6B:
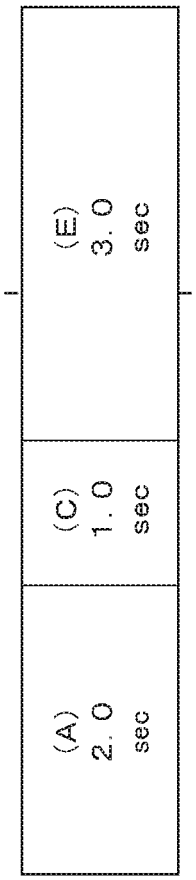
FIG. 6B is a schematic view for explaining a playback position of an image when performing key-point synchronization optimization in a key-point priority setting of a high rank image.

In a case of performing the optimization classified by score, as illustrated in FIG. 6B, the image A: 2.0 seconds, the image C: 1.0 second, and the image E: 3.0 seconds are set. The individual playback time of the image E is extended by 1.0 second which is necessary to reach the maximum playback time. In addition, since the key points are not taken into account in FIG. 6B, the positions of the start/end of playing back an image determined do not correspond to the positions of the key points.

Figure 6C:
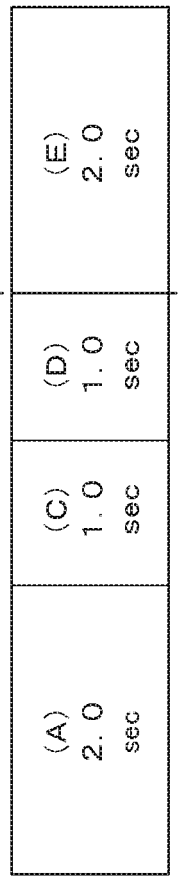
FIG. 6C is a schematic view for explaining a playback position of an image when performing key-point synchronization optimization in a key-point priority setting of a high rank image.

In the case of performing the key-point synchronization optimization, as illustrated in FIG. 6C, the image A: 2.0 seconds, the image C: 1.0 second, the image D: 1.0 second, and the image E: 2.0 seconds are set. Since the priority of the key points are not taken into account, it is not configured to switch to an image having a high score at a key point having a high priority.

Figure 6D:
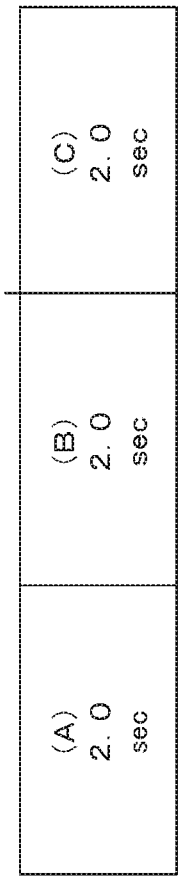
FIG. 6D is a schematic view for explaining a playback position of an image when performing key-point synchronization optimization in a key-point priority setting of a high rank image.

On the other hand, in the case of performing the key-point synchronization optimization in the key-point priority setting of a high rank image, as in the example illustrated in FIG. 6D, the combination of the image A: 2.0 seconds, the image B: 2.0 seconds, and the image C: 2.0 seconds becomes optimal. The individual playback time of the image C is extended by 1.0 second which is necessary to reach the maximum playback time.

In addition, since the images are selected so as to be switched to images having a high score at key points having a high priority, a path which is different from that in FIG. 6C is selected as an optimal path in FIG. 6D.

Since the individual playback time of the image A, which was selected first in FIG. 6D, is set to 2.0 seconds and the key point 1 does not arrive within the individual playback time, the image A is played back for 2.0 seconds and switched to the image B.

Although the image B is set to 3.0 seconds, since the key point arrives within the individual playback time determined, the individual playback time is adjusted to 2.0 seconds so that the display of the image B ends at the elapsed time: 4.0 seconds, which corresponds to the position of the key point.

In addition, although the individual playback time of the image C is set to 1.0 second, since the image score is high as compared to the other images, the image C is selected so as to be switched at a key point, and the individual playback time is adjusted to 2.0 seconds so that the display of the image C ends at the elapsed time: 6.0 seconds.

FIGS. 7A to 7C are schematic views for explaining a specific example of key-point synchronization optimization in a key-point priority setting of a high rank image. It should be noted that, in the present example, the maximum playback time of a highlight moving image is set to 6.0 seconds, and a key point is set at the playback elapsed time: 4 seconds in FIGS. 7C and 7D. In FIG. 7D, priority information is set at the key point.

As illustrated in the example of FIG. 7A, regarding the image score S and the individual playback time $\tau$ in each of the images p, the image score is [Score: 8], the rank is [Rank: 3], and the individual playback time is [Time: 2 seconds] in the image A. In the image B, the image score is [Score: 5], the rank is [Rank: 2], and the individual playback time is [Time: 3 seconds]. In the image C, the image score is [Score: 10], the rank is [Rank: 5], and the individual playback time is [Time: 1 second]. In the image D, the image score is [Score: 6], the rank is [Rank: 2], and the individual playback time is [Time: 2 seconds]. In the image E, the image score is [Score: 7], the rank is [Rank: 3], and the individual playback time is [Time: 2 seconds].

In a case of performing the optimization classified by score so as to be within the maximum playback time with the individual playback time/image score of images set as such, as illustrated in FIG. 7B, the added score becomes [25], which is the maximum score, by selecting a path combination from the image A: 2 seconds as an origin node to the image C: 3 seconds, and to the image E: 5 seconds. In other words, the path from the image A to the image C and to the image E becomes the optimal path in a case of performing the optimization classified by score.

In addition, in the case of performing the optimization classified by score so as to switch an image at a key point, as illustrated in FIG. 7C, the path combination from the image A: 2 seconds as an origin node to the image C: 3 seconds, to the image D: 4 seconds, and to the image E: 6 seconds is selected.

At this moment, since the image D straddles a key point, the individual playback time is adjusted to be from 3 seconds to 1 second. The added score in the path selected becomes [31], which is the maximum score. In other words, in the case of performing the optimization classified by score while taking into account a key point, a path from the image A to the image C, to the image D, and to the image E becomes an optimal path.

On the other hand, in the case of performing the optimization for the priority setting of a high rank image at a key point, if a parent exists on the time of the key point, and if an image which is selected next has a high rank, the score is multiplied by a bonus (multiplier bonus) according to the rank, not using a score that is set in advance.

In this way, since the score of the path through the node becomes relatively high, as a result, an image having a higher rank is switched on the key point.

In other words, in the example of FIG. 7D, since the 5× bonus is given to the image C having a high rank, the image C is selected as an image which is started at a key point, and the added score becomes [53], which is the maximum score, by selecting a path combination from the image A: 2 seconds as an origin node to the image B: 4 seconds, and to the image C: 5 seconds. In other words, in the case of performing the optimization for the priority setting of a high rank image at a key point, a path from the image A to the image B, and to the image C becomes the optimal path.

Therefore, with the present method, it is possible to select a path in which the added score becomes the maximum score as much as possible, for example, within the limitations such as time and the number of images, while switching the images having a higher rank by giving a bonus, in a case of a parent node being on a sound key point, when an image rank of an additional node from there is high, with respect to an image group which is scored based on values of the images. Therefore, it is possible to realize a combination of images having the maximum score within limitations such as the time and the number of images in synchronization with rhythm of a BGM.

Key-Point Synchronization Optimization: Individual Playback Time Adjustment when Short-Time Playback Image Exists In addition, since it is ineffective to display an image with a shorter individual playback time, it is possible to set a minimum individual playback time as a threshold of the shortest length of a playback time per image. In the present example, the minimum individual playback time is set to 0.5 seconds. In other words, it is configured to perform restriction to exclude frame images having the playback time less than 0.5 seconds from options for searching for a path (hereinafter, referred to as "short-time playback restriction").

FIGS. 8A to 8C are schematic views for explaining a playback position of an image in a case in which a short-time playback image exists when performing key-point synchronization optimization.

It should be noted that, as illustrated in FIG. 8A, the maximum playback time of a highlight moving image is set to 8.0 seconds in the present example. In addition, the key point in music is, for example, set automatically at a location at which a certain change in the sound information constituting the music is found. Each of the key points are set to key point 1: 1.3 seconds, key point 2: 2.6 seconds, key point 3: 3.2 seconds, key point 4: 5.4 seconds, key point 5: 6.7 seconds, and key point 6: 7.1 seconds.

As illustrated in FIG. 8B, in a case of performing the key-point synchronization optimization, the image F: 0.2 seconds and the image H: 0.4 seconds (having the individual playback time less than 0.5 seconds) exist. Therefore, since frame images having a short playback time exist, a moving image is not preferable for a user who switches images promptly.

In the present example, as illustrated in FIG. 8C, it is configured so that the individual playback time of the image F having the individual playback time of 0.2 seconds does not go below the minimum individual playback time by extending the individual playback time of the image E prior to the image F by one image. In other words, the individual playback time of the image E becomes 1.3 seconds. The images thereafter are set again by taking into account key points.

Although the individual playback time: 2.0 seconds is set in the image F selected, since a subsequent key point arrives, the individual playback time is adjusted to 1.3 seconds so as to end the display at the elapsed time of the key point 5: 6.7 seconds from after the end of playing back the image E.

In addition, although the individual playback time: 2.0 seconds is set in the image G, although a subsequent key point arrives, since 0.4 seconds which is less than 0.5 seconds remain to the subsequent key point, the individual playback time is adjusted to 1.3 seconds so as to end the display at the elapsed time of the maximum playback time: 8.0 seconds from after the end of playing back the image G, without taking into account key points.

FIGS. 9A to 9C are schematic views for explaining a specific example of an individual playback time adjustment in a case in which a short-time playback image exists when performing key-point synchronization optimization.

As illustrated in the example of FIG. 9A, regarding the image score S and the individual playback time τ in each of the images p, the image score is [Score: 4] and the individual playback time is [Time: 1 second] in the image A. In the image B, the image score is [Score: 10], and the individual playback time is [Time: 2 seconds]. In the image C, the image score is [Score: 5], and the individual playback time is [Time: 3 seconds]. In the image D, the image score is [Score: 6], and the individual playback time is [Time: 2 seconds]. In the image E, the image score is [Score: 7], and the individual playback time is [Time: 2 seconds].

In a case of performing the key-point synchronization optimization with the individual playback time/image score of such images, as illustrated in FIG. 9B, the added score becomes [27], which is the maximum score, by selecting a path combination from the image A: 1 second as an origin node to the image B: 3 seconds, to the image D: 2 seconds, and to the image E: 2 seconds. In this case, since a key point exists in the playback time of the image B, the playback time of the image B is made shorter from 3 seconds to 1 second.

In other words, in the case of performing the key-point synchronization optimization, the path from the image A, to the image B, to the image C, and to the image E becomes an optimal path.

However, for example, there may be a case in which, if an image is switched in a short time such as the individual playback time of 1 second, a viewer cannot recognize the contents of a highlight moving image depending on the image contents.

In view of this, in the present example, as illustrated in FIG. 9C, in a case of a node being generated at t=3, 1 second prior to a key point time, it is anticipated that, due to the influence from switching of images, the individual playback time from there becomes a short time; therefore, this is handled by extending the individual playback time of a parent image prior to the image by a corresponding length of time.

For example, in the path in which the image B is added after the image A being selected, since the individual playback time of the image B is 2 seconds, it should be originally t=3; however, it is moved to t=4. This indicates that a subsequent image is restricted to become a 1-second playback due to point-clipping by extending the playback of the image B to 3 seconds.

In the example of FIG. 9B, although the path from the image A, to the image B, to the image C, and to the image E, is selected as an optimal path, if the short-time playback is produced at the time of a node prior to a key point, in FIG. 9C, as a result, since a path search is performed after the abovementioned extension processing being performed, a path selecting the image A is avoided, and the path from the image B, to the image D, and to the image E which does not include the short-time playback and has the highest added score is selected.

In addition, in a case in which the frame images constituting a highlight moving image are a moving image, an image score or a moving image score may be changed by way of a playback time ratio, etc., by performing clipping and extension processing. For example, if a playback time is decreased by clipping to α times ($1>α≥0$), it is possible to make it difficult for an optimal path to be through a node by decreasing the score given to the node to α times. With such a configuration, it becomes easier to select paths which maintain original individual playback times as much as possible. Furthermore, it may be configured so as to make it difficult for an optimal path to be through the node by giving a large penalty to a path for which it is possible to generate a short-time playback, without performing the extension processing.

Therefore, in a case in which a node is generated prior to the time a of key point within a predetermined threshold, it is possible to restrict short-time playback by extending the playback time of a parent node to the time of the key point. Furthermore, the avoidance of an optimal path to a node and the guidance of the optimal path to the node is restricted by affecting an image score in terms of the playback time change by clipping and the extension processing. Therefore, it is possible to realize a combination of images having the maximum score within the limitation of the playback time of a moving image in synchronization with the rhythm of a BGM while restricting the short-time playback.

Figure 10:
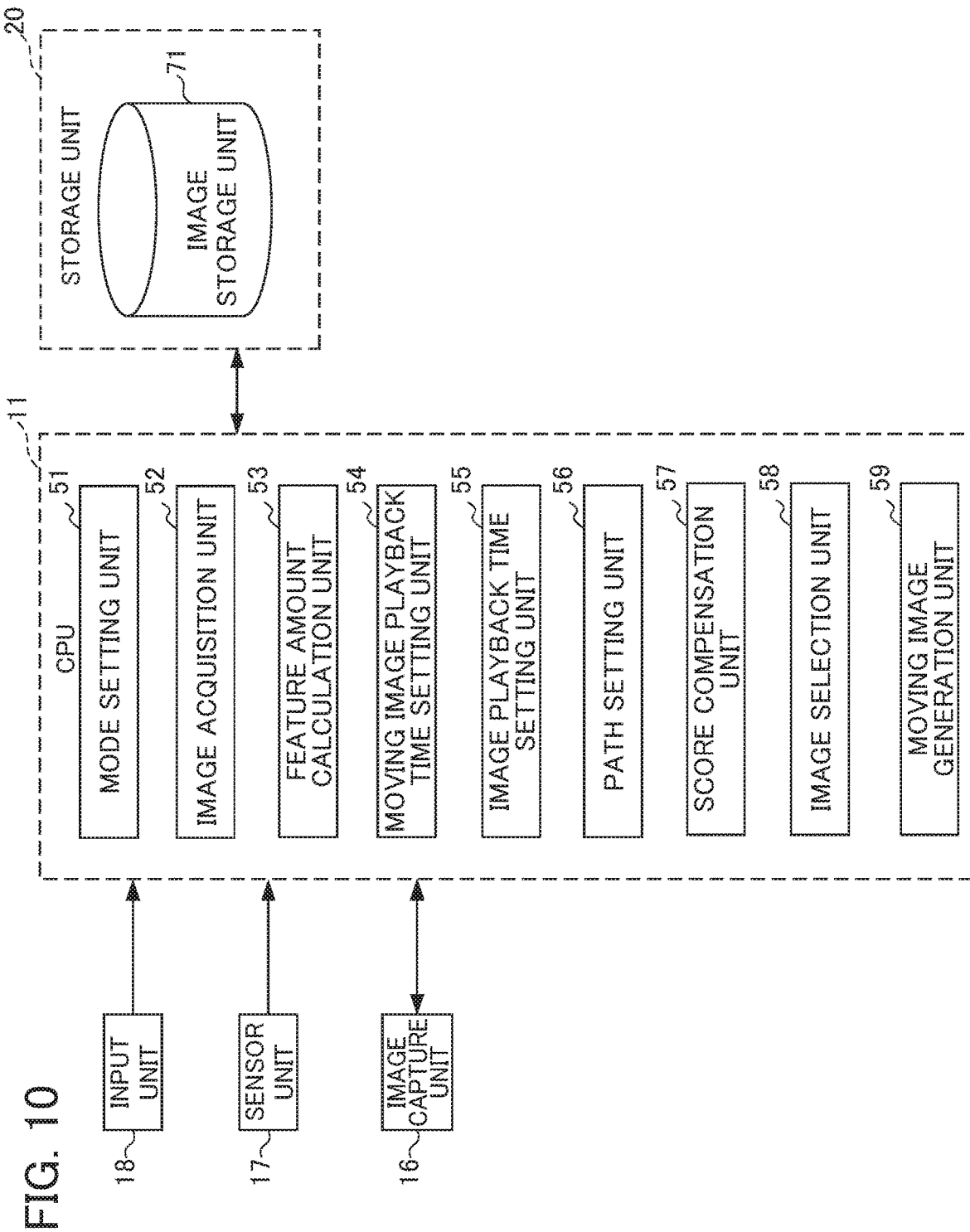
FIG. 10 is a functional block diagram illustrating a functional configuration for executing highlight moving image generation processing among the functional configurations of the image capture apparatus of FIG. 1.

FIG. 10 is a functional block diagram illustrating a functional configuration for executing highlight moving image generation processing among the functional configurations of the image capture apparatus 1 of FIG. 1.

Highlight moving image generation processing refers to a sequence of processing of generating a highlight moving image including candidate images as a combination having high image scores selected from among a plurality of candidate images.

As illustrated in FIG. 10, in the case of executing the highlight moving image generation processing, a mode setting unit 51, an image acquisition unit 52, a feature amount calculation unit 53, a moving image playback time setting unit 54, an image playback time setting unit 55, a path setting unit 56, a score compensation unit 57, an image selection unit 58, and a moving image generation 59 function in the CPU 11.

In addition, a moving image storage unit 71 is set in an area of the storage unit 20.

In the moving image storage unit 71, image data is stored which is associated with sensor information acquired when photography.

The mode setting unit 51 sets a mode via the input unit 18 by a user, for example.

In the present embodiment, the modes of "normal mode", "dissimilarity improvement mode", and "key-point switching mode" can be set.

The "normal mode" is a mode which selects a path of a combination having the highest score with a time within the maximum playback time of moving images that are set, and then selects images that constitute the path selected as frame images. In the "normal mode", a path selection of a combination of images is performed by using the abovementioned method of "Optimization classified by score".

The "dissimilarity improvement mode" is a mode that improves the dissimilarity by avoiding similar images being selected and thus eliminating redundancy. In the "dissimilarity improvement mode", a path selection of a combination of images is performed by using the abovementioned method of "Improvement of dissimilarity (elimination of redundancy)".

The "key-point switching mode" is a mode in which a BGM is simultaneously played back while playing back a moving image, images are switched at key points of the BGM, images having a higher rank are switched at the key points, and the matter of switching of images becoming short in time is restricted by switching the images at key points. In the "key-point switching mode", path selection of a combination of images is performed by using the abovementioned methods of "Sound synchronization playback: key-point synchronization optimization", "Key-point synchronization optimization: key-point priority of high rank image", and "Key-point synchronization optimization: individual playback time adjustment when short-time playback image exists".

The image acquisition unit 52 acquires a plurality of candidate images as targets for highlight moving images from the moving image storage unit 71.

The feature amount calculation unit 53 calculates a feature amount for each of the candidate images thus acquired. In the present embodiment, the feature amount is calculated based on feature points, etc., within images analyzed through image analyses on the candidate images. In addition, the scores of the candidate images are calculated based on the feature amounts, and ranking of the candidate images is performed according to the scores. In other words, the scores and the ranking are given to the candidate images.

The moving image playback time setting unit 54 sets the maximum playback time (for example, 6 seconds) of a highlight moving image via the input unit 18 by a user.

The image playback time setting unit 55 sets individual playback times of the candidate images within the moving image according to the ranks of the candidate images which are determined based on the scores. It should be noted that the individual playback times of the candidate images may be configured so as to be set by a user regardless of the scores or the ranks.

The path setting unit 56 sets a path combination (arrangement) that can be made in a matrix constituted by the individual playback time of the highlight moving image and the candidate images based on the order of photographing the images and the individual playback times of the candidate images that are set.

The score compensation unit 57 compensates the scores according to the mode that is set.

It should be noted that, in the case of the "dissimilarity improvement mode", if frame images having a high similarity continue, the score is compensated by giving a penalty. In addition, in the case of the "key-point switching mode", if clipping at a key point, the score is compensated by adding a bonus according to a rank with respect to images having a high rank among the images for which it is possible to be selected after clipping.

The image selection unit 58 selects a path having the highest added score and selects the candidate images to constitute a path. It should be noted that, in the case of the "key-point switching mode", the candidate images are selected according to an excess time after clipping to correspond to a key point. However, a path is selected by using an added score after compensation. In addition, for example, if there is a candidate image in which the individual playback time becomes shorter, for example, less than 0.5 seconds, it is configured to extend the playback time of a parent of the candidate image (a candidate image prior to the image by one) which is located upstream in a path so that a child (a subsequent candidate image) is switched at a key point.

The moving image generation unit 59 generates a highlight moving image which is configured so that the candidate images of the path selected by the image selection unit 58 are within the maximum playback time that is set.

Figure 11:
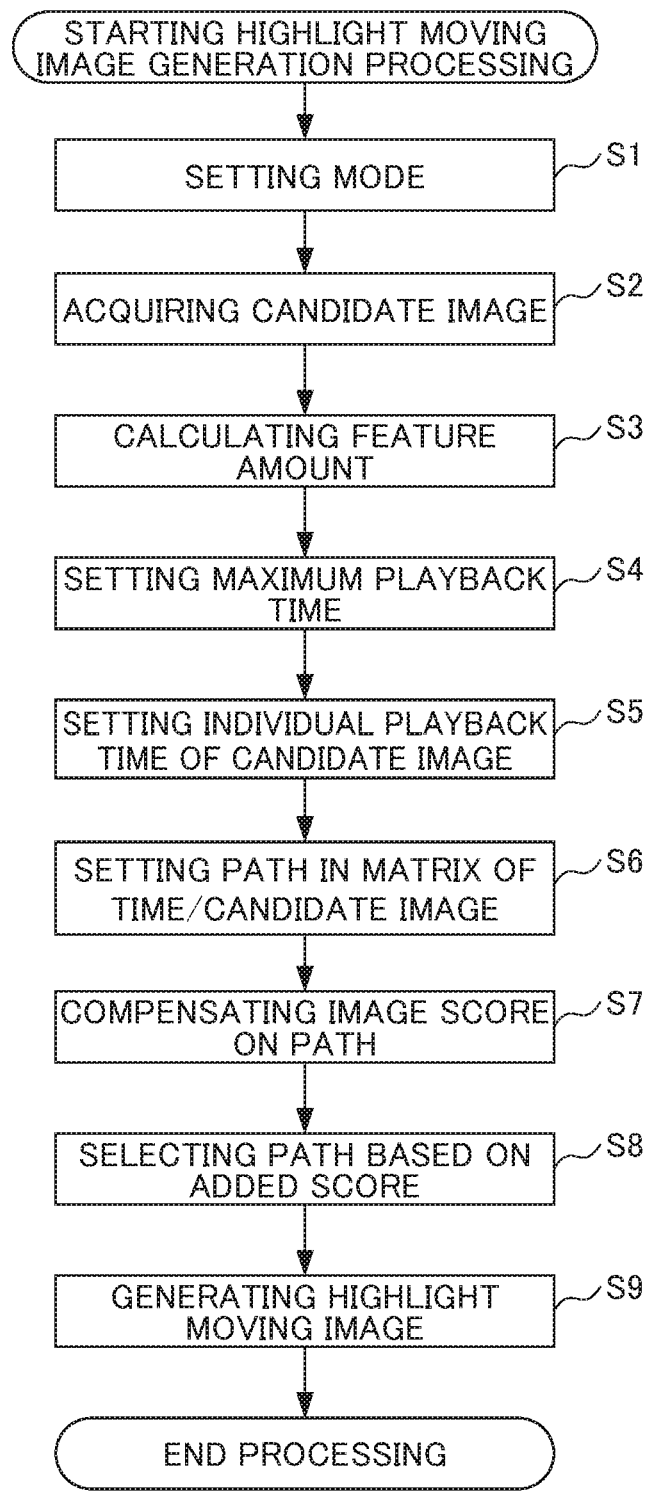
FIG. 11 is a flowchart illustrating a flow of the highlight moving image generation processing executed by the image capture apparatus of FIG. 1 having the functional configuration of FIG. 10.

FIG. 11 is a flowchart illustrating a flow of the highlight moving image generation processing executed by the image capture apparatus 1 of FIG. 1 having the functional configuration of FIG. 10.

The highlight moving image generation processing starts by a user's operation of starting the highlight moving image generation processing on the input unit 18.

In Step S1, the mode setting unit 51 sets a mode via the input unit 18 by the user, for example.

In the present embodiment, the modes of "normal mode", "dissimilarity improvement mode", and "key-point switching mode" can be set.

The "normal mode" is a mode which selects a path of a combination having the highest score with a time within the maximum playback time of moving images that are set, and then selects images that constitute the path selected as frame images.

The "dissimilarity improvement mode" is a mode that improves the redundancy by avoiding images having a high similarity in which the contents are similar from being selected.

The "key-point switching mode" is a mode in which a BGM is simultaneously played back while playing back a moving image, images are switched at key points of the BGM, images having a higher rank are switched at the key points, and the matter of the playback time of the images becoming short in time is restricted by switching the images at key points.

In Step S2, the image acquisition unit 52 acquires a plurality of candidate images as targets for highlight moving images from the moving image storage unit 71.

In Step S3, the feature amount calculation unit 53 calculates a feature amount for each of the candidate images thus acquired. In the present embodiment, the feature amount is calculated based on feature points, etc., within images analyzed through image analyses on the candidate images. Then, the scores of the candidate images are calculated based on the feature amounts, and ranking of the candidate images is performed according to the scores. In other words, the scores and the ranking are given to the candidate images.

In Step S4, the moving image playback time setting unit 54 sets the maximum playback time (for example, 6 seconds) of a highlight moving image via the input unit 18 by a user.

In Step S5, the image playback time setting unit 55 sets individual playback times of the candidate images within the moving image according to the ranks of the candidate images which are determined based on the scores. It should be noted that the individual playback times of the candidate images may be configured so as to be set by a user regardless of the scores or the ranks.

In Step S6, the path setting unit 56 sets a path combination (arrangement) that can be made in a matrix constituted by the individual playback time of the highlight moving image and the candidate images based on the order of photographing the images and the individual playback times of the candidate images that are set.

In Step S7, the score compensation unit 57 compensates the scores according to the mode that is set.

In the case of the "dissimilarity improvement mode", if frame images having a high similarity are consecutive, the score is compensated by giving a penalty.

In the case of the "key-point switching mode", if clipping at a key point, the score is compensated by adding a bonus according to a rank with respect to images having a high rank, among the images for which it is possible to be selected after clipping.

In Step S8, the image selection unit 58 selects a path having the highest added score and selects the candidate images that constitute the path.

In the case of the "key-point switching mode", the candidate images are selected according to an excess time after clipping to correspond to a key point. In this case, a path is selected by using an added score after compensation. In addition, for example, if there is a candidate image in which the playback time becomes shorter, for example, less than 0.5 seconds, it is configured to extend the individual playback time of a parent of the candidate image (a candidate image prior to the image by one) which is located upstream in a path so that a child (a subsequent candidate image) is switched at a key point.

In Step S9, the moving image generation unit 59 generates a highlight moving image which is configured so that the candidate images of the path selected by the image selection unit 58 are within the maximum playback time that is set.

Then, the highlight moving image generation processing ends.

The image capture apparatus 1 configured as above includes the image acquisition unit 52, the feature amount calculation unit 53, the moving image playback time setting unit 54, the image playback time setting unit 55, and the image selection unit 58.

The image acquisition unit 52 acquires a plurality of images.

The feature amount calculation unit 53 evaluates the plurality of images acquired by the image acquisition unit 52.

The moving image playback time setting unit 54 sets a total playback time of a moving image composed of the plurality of images.

The image playback time setting unit 55 sets individual playback times for each of the plurality of images.

The image selection unit 58 selects a predetermined number of images according to the total playback time from the plurality of images, based on (i) evaluation results of the plurality of images which have been evaluated, and (ii) the individual playback times which have been set, and (iii) the total playback time which has been set.

Therefore, in the image capture apparatus 1, it is possible to select images for generating a moving image even in a case in which the individual playback times of images which are targeted for selection are different.

The image selection unit 58 selects a predetermined number of images which have high evaluation value from the plurality of images, and the total time of the individual playback times of the plurality of images selected does not exceed the total playback time.

Therefore, in the image capture apparatus 1, it is possible to select images so as to be within the time that is set.

The image capture apparatus 1 further includes the score compensation unit 56 that judges the similarity in images.

The image selection unit 58 selects images based on a judgment result by the score compensation unit 56.

Therefore, in the image capture apparatus 1, it is possible to select images for generating a moving image according to the similarity.

The score compensation unit 56 judges the similarity based on information associated with the contents of images or information associated with the timing of photography.

Therefore, in the image capture apparatus 1, it is possible to judge the similarity of the images relating to information associated with the contents of images or information associated with the timing of photography.

The score compensation unit 56 sets, as comparison targets, images located ahead and behind for which the order of being selected by the image selection unit 58 is close among the images which are targeted for judging the similarity.

Therefore, in the image capture apparatus 1, it is possible to judge the similarity of the images for which the order of being selected is close.

The image playback time setting unit 55 sets the individual playback time based on an evaluation result by the feature amount calculation unit 53.

Therefore, in the image capture apparatus 1, it is possible to set an individual playback time relating to an evaluation result.

The feature amount calculation unit 53 evaluates images based on information associated with the contents of images or information associated with the timing of photography.

Therefore, in the image capture apparatus 1, it is possible to perform the evaluation relating to information associated with the contents of images or information associated with the timing of photography.

The feature amount calculation unit 53 evaluates images from a plurality of different kinds of viewpoints.

Therefore, in the image capture apparatus 1, it is possible to evaluate the images from a plurality of different kinds of viewpoints comprehensively.

The image selection unit 58 selects a predetermined number of images so that information relating to the photographing timing of images to be photographed is dispersed.

Therefore, in the image capture apparatus 1, it is possible to select images for generating a moving image in which the images which are targeted for selection are dispersed.

In addition, the image capture apparatus 1 includes the mode setting unit 51 which sets playback start timing.

The image selection unit 58 selects a predetermined number of images by taking into account the playback start timing which is set by the mode setting unit 51.

Therefore, in the image capture apparatus 1, it is possible to select images for generating a moving image so as to correspond to the playback start timing that is set.

The mode setting unit 51 sets the playback start timing so as to correspond to a musical sound.

Therefore, in the image capture apparatus 1, it is possible to select images for generating a moving image so as to correspond to the musical sound.

It should be noted that a musical piece is structured organically by a plurality of musical sounds.

It should be noted that the present invention is not to be limited to the aforementioned embodiments, and that modifications, improvements, etc. within a scope that can achieve the objects of the present invention are also included in the present invention.

Although the maximum playback time of a moving image is set as the limitation of a highlight moving image in the abovementioned embodiment, the present invention is not limited thereto and may be configured so that the maximum number of frame images constituting a moving image may be set as a condition for limitation, for example.

Furthermore, although it is configured to acquire a plurality of static images as candidate images and select images from the candidate images thus acquired so as to generate a highlight moving image in the abovementioned embodiment, it may be configured so as to set frame images constituting a moving image in a moving image or a plurality of moving images as candidate images.

Furthermore, it may also be configured to generate an image which is created from a plurality of static images, for example, in place of the highlight moving image.

Furthermore, although it is configured so that, in a case of adding up the individual playback times of the images to be selected, the total playback time which is added up becomes the maximum playback time which does not exceed the maximum playback time which is set by the total playback time which is added up in the abovementioned embodiment, the present invention is not limited thereto. For example, it may be configured so as to select an image which becomes the maximum score in the proximity of a playback time that is set (the total playback time).

Furthermore, although it is configured so as not to select images having a high similarity consecutively in the abovementioned embodiment, the present invention is not limited thereto, and it may be configured to select images having a high similarity positively.

Furthermore, the similarity can be determined based on image contents such as the layout in images, the angle of field, and color, and information relating to photography such as a photographing time and sensor information upon photography.

Furthermore, the evaluation of images can also be performed based on image contents such as the layout in images, the angle of field, and color, and information relating to photography such as a photographing time and sensor information upon photography. Furthermore, although the evaluation of images may be performed in a single image, it may also be configured to perform the evaluation of a single image in comparison with another image. For example, in a case in which a single image is evaluated as high in view of the image contents, but images having similar evaluations exist in the same period, it may be configured to lower the evaluations of the images which exist in the same period in view of the relationships with the other images, except for an image having the highest evaluation.

Furthermore, although the switching point is configured to be set based on the contents of a musical piece in the abovementioned embodiment, the present invention is not limited thereto. For example, for the switching points, a plurality of candidates are picked up from the contents of a musical piece and the degree of importance is assigned to each of the candidates. For the switching points, candidates having at least a predetermined degree of importance among the degrees of importance thus assigned are set as a switching point. Furthermore, it may be configured so as to select images by judging whether to switch or not according to the degrees of importance thus assigned with respect to the switching points thus set.

In addition, although it is configured so that the maximum playback time is set arbitrarily in the abovementioned embodiment, the present invention is not limited thereto, and it may also be configured so that the length of a musical piece used for a BGM is set as the maximum playback time.

Furthermore, although it is configured so that the switching point is set based on the contents of a musical piece which is played back with a moving image in the abovementioned embodiment, it may also be configured so as to set the switching point according to the number of images to be selected, for example. In this case, if the number of switching points based on the contents of a musical piece is more than the images selected, it may be configured so as to exclude points having a small change in contents from the switching points, and if the number of switching points based on the contents of a musical piece is less than the images selected, it may be configured so as to set a point having the largest change in contents in the remaining points as a switching point. Furthermore, the number of the switching points may increase or decrease according to playback periods such as a first half, a second half, and a middle stage.

In the aforementioned embodiments, explanations are provided with the example of the image capture apparatus 1 to which the present invention is applied being a digital terminal; however, the present invention is not limited thereto in particular.

For example, the present invention can be applied to any electronic device in general having the highlight moving image generation processing function. For example, the present invention can be applied to a laptop personal computer, a printer, a television receiver, a video camera, a portable navigation device, a cell phone device, a smartphone, a portable gaming device, and the like.

The processing sequence described above can be executed by hardware, and can also be executed by software.

In other words, the hardware configuration of FIG. 10 is merely an illustrative example, and the present invention is not particularly limited thereto. More specifically, the types of functional blocks employed to realize the above-described functions are not particularly limited to the examples shown in FIG. 10, so long as the information processing apparatus 1 can be provided with the functions enabling the aforementioned processing sequence to be executed in its entirety.

A single functional block may be configured by a single piece of hardware, a single installation of software, or a combination thereof.

In a case in which the processing sequence is executed by software, the program configuring the software is installed from a network or a storage medium into a computer or the like.

The computer may be a computer embedded with dedicated hardware.

Alternatively, the computer may be a computer capable of executing various functions by installing various programs, e.g., a general-purpose personal computer.

The storage medium containing such a program can not only be constituted by the removable medium 31 of FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 1 in which the program is recorded or a hard disk, etc. included in the storage unit 20 of FIG. 1.

It should be noted that, in the present specification, the steps defining the program recorded in the storage medium include not only the processing executed in a time series following this order, but also processing executed in parallel or individually, which is not necessarily executed in a time series.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image processing apparatus, comprising:
   a processor which is configured to:
   acquire a plurality of images;
   calculate an evaluation value of each of the plurality of images;
   evaluate the plurality of images based on the calculated evaluation value;
   set a total playback time of a moving image;
   set an individual playback time for each of the plurality of images, based on results of the evaluation of the plurality of images;
   select a predetermined number of images corresponding to the total playback time from the plurality of images so that the sum of the evaluation value of each image is highest, based on (i) the individual playback times which have been set for each image and (ii) the evaluation value which has been calculated;
   set switching time points of images in the total playback time that is set; and
   select the predetermined number of images from the plurality of images so as to be within the total playback time based on the switching time points.

2. The image processing apparatus according to claim 1, wherein the processor is configured to select the predetermined number of images which have high total evaluation value from the plurality of images.

3. The image processing apparatus according to claim 1, wherein the processor is configured to:
   further judge similarity among the plurality of images, wherein select the images based on judgment results.

4. The image processing apparatus according to claim 3, wherein the processor is configured to judge the similarity based on information associated with contents of images or information associated with timing of photography.

5. The image processing apparatus according to claim 3, wherein the processor is configured to set, as comparison targets, images located ahead and behind for which an order of being selected is close among images which are targeted for judging the similarity.

6. The image processing apparatus according to claim 1, wherein the processor is configured to evaluate the images based on information associated with contents of images or information associated with timing of photography.

7. The image processing apparatus according to claim 1, wherein the processor is configured to select the predetermined number of images so that information associated with photographing timing of images to be photographed is dispersed.

8. The image processing apparatus according to claim 1, wherein the processor is configured to set the switching time points so as to correspond to a musical sound.

9. The image processing apparatus according to claim 1, wherein the processor is configured to set a different individual playback time for each of the plurality of images acquired.

10. The image processing apparatus according to claim 1, wherein the processor is further configured to:
    change an individual playback time of the image or an individual playback time of either image located ahead or behind, in a case in which an individual playback time of the image is shorter than a predetermined time.

11. The image processing apparatus according to claim 1, wherein the processor is further configured to set a degree of importance for at least one of the switching time points.

12. The image processing apparatus according to claim 1, wherein the processor is further configured to select images so as not to switch images at the switching time points which do not satisfy a predetermined degree of importance.

13. The image processing apparatus according to claim 1, wherein the processor is further configured to select the predetermined number of images so that images having a high evaluation result are assigned to the switching time points having a high degree of importance.

14. An image processing apparatus, comprising:
    a processor which is configured to:
    acquire a plurality of images;
    evaluate the plurality of images;
    set an individual playback time to each of the plurality of images acquired, based on results of the evaluation of the plurality of images;
    set a total playback time;
    set switching time points of images in the total playback time that is set; and
    select a predetermined number of images from the plurality of images so as to be within the total playback time based on the switching time points,
    wherein the processor is further configured to select the predetermined number of images so that images having a high evaluation result are assigned to the switching time points.

15. The image processing apparatus according to claim 14,
wherein the processor is further configured to set a different individual playback time for each of the plurality of images acquired.

16. The image processing apparatus according to claim 14,
wherein the processor is further configured to evaluate the images based on information associated with contents of images or information associated with timing of photography.

17. The image processing apparatus according to claim 14,
wherein the processor is further configured to select the predetermined number of images so that evaluation results of the images selected become high and a total time of the individual playback times of the plurality of images selected does not exceed the total playback time.

18. An image selection method comprising the steps of:
acquiring a plurality of images;
calculating an evaluation value of each of the plurality of images;
evaluating the plurality of images acquired in the step of acquiring based on the calculated evaluation value;
setting a total playback time of moving image;
setting an individual playback time for each of the plurality of images, based on results of the evaluation of the plurality of images;
selecting a predetermined number of images corresponding to the total playback time from the plurality of images so that the sum of the evaluation values of the selected images is highest, based on (i) the individual playback times which have been set for each image and (ii) evaluation value which has been set calculated;
setting switching time points of images in the total playback time that is set; and
selecting the predetermined number of images from the plurality of images so as to be within the total playback time based on the switching time points.

19. A non-transitory storage medium encoded with a computer-readable program that enables a computer to execute functions as:
acquire a plurality of images;
calculate an evaluation value of each of the plurality of images;
evaluate the plurality of images based on the calculated evaluation value;
set a total playback time of moving image;
set an individual playback time for each of the plurality of images, based on results of the evaluation of the plurality of images;
select a predetermined number of images corresponding to the total playback time from the plurality of images so that the sum of the evaluation values of the selected images is highest, based on (i) the individual playback times which have been set for each image and (ii) the evaluation value which has been calculated;
set switching time points of images in the total playback time that is set; and
select the predetermined number of images from the plurality of images so as to be within the total playback time based on the switching time points.

* * * * *

UNITED STATES PATENT AND TRADEMARK OFFICE
CERTIFICATE OF CORRECTION

Page 1 of 1

PATENT NO. : 10,658,006 B2
APPLICATION NO. : 15/347517
DATED : May 19, 2020
INVENTOR(S) : Masaru Onozawa It is certified that error appears in the above-identified patent and that said Letters Patent is hereby corrected as shown below:

In the Claims

Claim 18, Column 26, Line 3, after "been" delete "set".

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*